United States Patent
Clark et al.

(10) Patent No.: US 12,146,677 B2
(45) Date of Patent: Nov. 19, 2024

(54) TWO-WIRE CONNECTION WITH COMPONENT CONTROL

(71) Applicant: Carrier Corporation, Palm Beach Gardens, FL (US)

(72) Inventors: Matthew Clark, Rochester, NY (US); Eduardo Iturbide, Syracuse, NY (US); Daniel Nocito, Stamford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 381 days.

(21) Appl. No.: 17/572,863

(22) Filed: Jan. 11, 2022

(65) Prior Publication Data

US 2022/0221187 A1    Jul. 14, 2022

Related U.S. Application Data

(60) Provisional application No. 63/135,794, filed on Jan. 11, 2021.

(51) Int. Cl.
*F24F 11/88* (2018.01)
*H02M 7/5387* (2007.01)
*H04B 3/56* (2006.01)

(52) U.S. Cl.
CPC ......... *F24F 11/88* (2018.01); *H02M 7/53873* (2013.01); *H04B 3/56* (2013.01); *H04B 2203/5416* (2013.01)

(58) Field of Classification Search
CPC .. F24F 11/88; H02M 7/5387; H02M 7/53873; H04B 2203/5416; H04B 3/56
See application file for complete search history.

(56) References Cited

U.S. PATENT DOCUMENTS

| | | | |
|---|---|---|---|
| 6,956,463 B2 | 10/2005 | Crenella et al. | |
| 2009/0195179 A1* | 8/2009 | Joseph | H05B 47/185 315/287 |
| 2013/0002012 A1* | 1/2013 | Korol | G05B 19/0423 307/1 |
| 2013/0325191 A1* | 12/2013 | Mukai | F24F 11/63 700/276 |
| 2014/0316586 A1* | 10/2014 | Boesveld | F24F 11/61 700/278 |
| 2015/0130598 A1* | 5/2015 | Chen | H04B 3/542 340/12.32 |
| 2018/0181148 A1* | 6/2018 | Warren | G05D 23/19 |
| 2019/0064857 A1* | 2/2019 | Metselaar | G05D 23/19 |

* cited by examiner

*Primary Examiner* — Kidest Bahta
(74) *Attorney, Agent, or Firm* — CANTOR COLBURN LLP

(57) ABSTRACT

Provided are embodiments for a system for providing component control over a two-wire connection. The embodiments can include a control unit connected to a power source, a remote unit coupled to the control unit over the two-wire connection, the two-wire connection including a power/communication wire and a common wire, and a bridge-type amplifier configured to receive a power signal from the remote unit, the bridge-type amplifier configured to generate a square wave from the power signal. Also provided are embodiments for a method for providing component control over a two-wire connection.

5 Claims, 4 Drawing Sheets

TWO-WIRE CONNECTION WITH COMPONENT CONTROL

CROSS-REFERENCE TO RELATED APPLICATIONS

This application claims the benefit of U.S. Provisional Application No. 63/135,794 filed Jan. 11, 2021, the disclosure of which is incorporated herein by reference in its entirety.

BACKGROUND

Exemplary embodiments pertain to the art of power and control of equipment and more specifically to two-wire connection architecture that provides for component control.

Heating Ventilation and Air Conditioning (HVAC) systems are typically performed using 24V alternating current (AC). The single source must provide power for all the control components within the HVAC system. In current systems, power is typically delivered over a pair of wires, while one or more additional wires are used to provide communication. System installation can become challenging if the existing house wiring does not support the wiring required for the desired features. It is therefore desirable to have a system that needs only 2 wires to provide both power and communication.

BRIEF DESCRIPTION

According to an embodiment, a system for providing component control over a two-wire connection is provided. The system can include a control unit connected to a power source; a remote unit coupled to the control unit over the two-wire connection, the two-wire connection consisting of a power/communication wire and a common wire; and a bridge-type amplifier configured to receive a power signal from the remote unit, the bridge-type amplifier configured to generate a square wave from the power signal.

In addition to one or more of the features described herein, or as an alternative, further embodiments include a two-wire connection that is a 2-wire buss configured to transmit power and communication data.

In addition to one or more of the features described herein, or as an alternative, further embodiments include a two-wire connection that provides power on a positive cycle of a waveform and communication data on the negative cycle of the waveform between the control unit and the remote unit.

In addition to one or more of the features described herein, or as an alternative, further embodiments include a bridge-type amplifier that is configured to output the square wave to drive a switch.

In addition to one or more of the features described herein, or as an alternative, further embodiments include a power signal is a direct current (DC) signal and the square wave is an alternating current (AC) signal.

In addition to one or more of the features described herein, or as an alternative, further embodiments include a switch that is a compressor contactor of a heating, ventilation, and/or air conditioning (HVAC) system.

In addition to one or more of the features described herein, or as an alternative, further embodiments include a control unit that is an indoor unit of the HVAC system and the remote unit that is an outdoor unit of the HVAC system.

According to another embodiment, a method for providing component control over a two-wire connection is provided. The method can include receiving a power signal at a bridge-type amplifier; converting the power signal to a square wave; and outputting the square wave to drive a switch.

In addition to one or more of the features described herein, or as an alternative, further embodiments include a two-wire connection that is a 2-wire buss configured to transmit power and communication data.

In addition to one or more of the features described herein, or as an alternative, further embodiments include a two-wire connection that provides power on a positive cycle of a waveform and communication on the negative cycle of the waveform between the control unit and the remote unit.

In addition to one or more of the features described herein, or as an alternative, further embodiments include a power signal that is a direct current (DC) signal and the square wave is an alternating current (AC) signal.

In addition to one or more of the features described herein, or as an alternative, further embodiments include a switch that is a compressor contactor of a heating, ventilation, and/or air conditioning (HVAC) system.

In addition to one or more of the features described herein, or as an alternative, further embodiments include a bridge-type amplifier that is configured to receive the power signal from a remote unit, the power signal being transmitted from a control unit over the two-wire connection to the remote unit.

According to another embodiment, a bridge-type amplifier includes an input configured to receive a power signal from a remote unit, the power signal being transmitted from a control unit over a two-wire connection to the remote unit; a circuit configured to convert the power signal to a square wave; and an output configured to provide the square wave to drive a switch.

In addition to one or more of the features described herein, or as an alternative, further embodiments include a two-wire connection that is a 2-wire buss configured to transmit power and communication data.

In addition to one or more of the features described herein, or as an alternative, further embodiments include a two-wire connection that provides power on a positive cycle of a waveform and communication on the negative cycle of the waveform between the control unit and the remote unit.

In addition to one or more of the features described herein, or as an alternative, further embodiments include a power signal that is a direct current (DC) signal and the square wave is an alternating current (AC) signal.

In addition to one or more of the features described herein, or as an alternative, further embodiments include a switch that is a compressor contactor of a heating, ventilation, and/or air conditioning (HVAC) system.

In addition to one or more of the features described herein, or as an alternative, further embodiments include a control unit that is an indoor unit of the HVAC system and the remote unit is an outdoor unit of the HVAC system.

Technical effects of embodiments of the present disclosure include regenerating the power provided from a two-wire connection to drive and control high power devices and equipment.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A two-wire connection allows for the control unit to not only transmit power to a remote unit, but also allows the control unit to communicate with the remote unit over the same medium. The two-wire connection enables transmission of an AC signal where power is transmitted to the remote unit over the positive cycle and communication data is transmitted to the remote unit over the negative cycle of the waveform. An existing two-wire connection between a control unit and a remote unit is described in U.S. Pat. No. 6,956,463 B2, entitled, "METHOD AND APPARATUS FOR PROVIDING BOTH POWER AND COMMUNICATION OVER TWO WIRES BETWEEN MULTIPLE LOW VOLTAGE AC DEVICE," filed on Oct. 2, 2002, the entire disclosure of which is hereby incorporated by reference herein. The two-wire connection architecture is configured to transmit both power and communication over two wires.

The system alternates between providing power to the remote units and communicating with the units, and because the power is only transmitted to the load during the positive half of the cycle the power the amount of power that can be produced for the load is limited.

Therefore, existing systems may only be capable of powering low-power devices and/or DC devices. Other devices and equipment requiring high power such as a compressor cannot be operated using the current systems. For example, in HVAC applications, the compressor contactor cannot be reliably controlled and operated when using the traditional two-wire connection architecture because there is not enough power generated on the positive half cycle to power the compressor contactor.

The techniques described herein incorporate an additional circuit to generate an AC signal that is used to control the compressor contactor. This enables the control of higher power AC devices that existing solutions are unable to accommodate.

Figure 1:
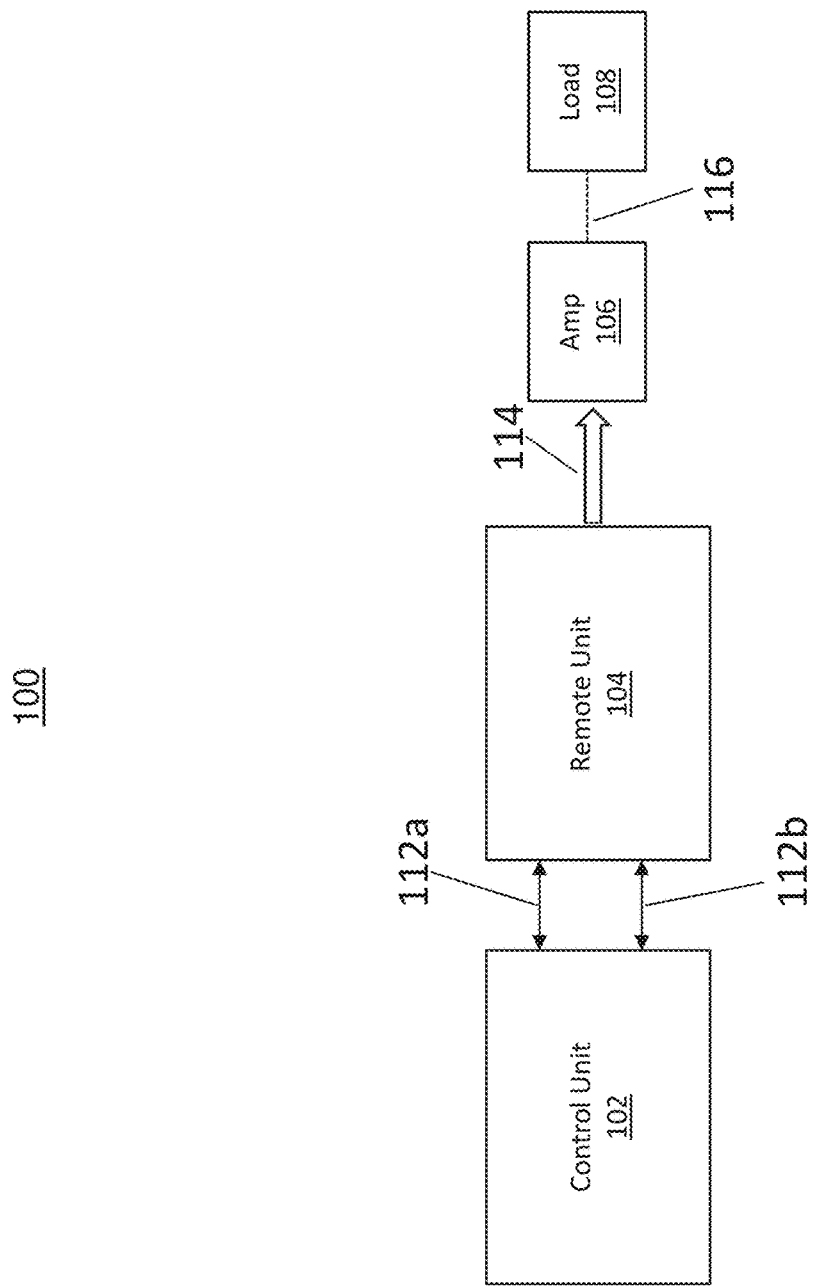
FIG. 1 shows a control unit connected to a remote unit over a two-wire connection in accordance with one or more embodiments.

FIG. 1 depicts a system 100 including a control unit 102 and a remote unit 104 device in accordance with one or more embodiments of the invention. The control unit 102 can be an indoor unit (IDU). It should be understood the IDU can include other types of units such as but not limited to a furnace or fan coil or any other type of residential unit for a house. The control unit 102 can include a transformer and may be configured to receive a power signal (e.g., a 24V AC signal).

The system 100 also includes a remote unit 104 that is operably coupled to the control unit 102. The remote unit 104 can include an outdoor unit (ODU). In one or more embodiments, the control unit 102 and the remote unit 104 are configured to communicate using two-wire connection. The two-wire connection may be a 2-wire buss. The control unit 102 may be configured to provide half-wave rectified AC power over the two wires. The two wires may allow two-way communication between all components connected to the 2-wire buss (112a, 112b). The 2-wire buss can include a power/communication wire and a common wire. The system 100 described herein enables the transmission of power and data over two wires, instead of relying on an additional (third) wire to provide communication.

The system 100 includes the bridge-type amplifier device 106 which is configured to receive power from the remote unit 104. The output 114 of the remote unit 104 is coupled to the bridge-type amplifier 106 to provide the incoming power signal. The remote unit 104 provides a 24V DC signal to the bridge-type amplifier 106. Further details of the bridge-type amplifier 106 are discussed with reference to FIG. 2 below. The output 116 of the bridge-type amplifier 106 provides power to the switch 108 which may be a compressor contactor. The regenerated power, as a result of the bridge-type amplifier 106, is sufficient enough to reliably control the compressor contactor, where the previous two-wire connection architecture was unable to provide enough. The output 116 of the bridge-type amplifier 106 is used to control and operate the switch 108. Although, the switch 108 is shown as a compressor contactor, it should be understood that other high-power devices and/or equipment can be coupled to the system 100 described herein. The configuration of the system 100 allows for energy to be transferred to the high-power switch 108 during the positive half cycle and the negative half cycle while maintaining the ability to communicate over the negative half cycle.

Figure 2:
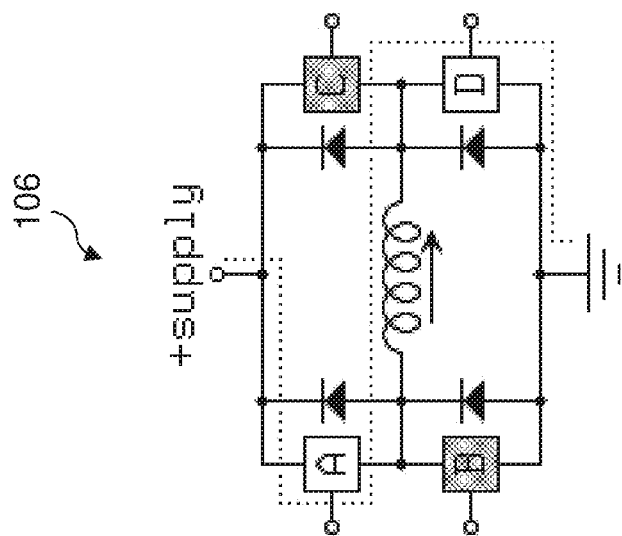
FIG. 2 shows a bridge-type amplifier for regenerating an AC signal in accordance with one or more embodiments.

FIG. 2 depicts an example bridge-type amplifier 106 of system 100 that can be used to regenerate an AC signal in accordance with one or more embodiments. It should be understood the bridge-type amplifier 106 is only provided as an example illustration and is not intended to limit the scope. Other types of devices can be incorporated into the system 106 to generate a square wave from the power signal. As shown in FIG. 2, the bridge-type amplifier 106 is coupled to a positive voltage rail (+supply) and ground (or a negative voltage rail).

In a non-limiting example, the bridge-type amplifier 106 shown in FIG. 2 includes four transistors (A, B, C, D) arranged in bridge-type configuration. When operated in a forward mode, the transistors A and D are switched ON (and transistors B and C are switched OFF) which allows current to flow through the load (depicted as an inductor) in a forward direction. In a non-limiting example, the current flows through the load through the path shown in FIG. 2. When operated in a reverse mode, transistors B and C are switched ON (and transistors A and D are switched OFF) which allows current to flow through the load in the opposite direction of the current in the forward mode. In one or more embodiments, diodes are placed across each of the transistors. In one or more embodiments, a controller (not shown) can provide signals to the gates of the transistors (A, B, C, D) to operate the bridge-type amplifier.

The load (shown as an inductor) (i.e., the contactor coil) is energized by an output of the bridge-type amplifier 106 in such a way that the current in the coil reverses its direction of the circulation with each half cycle of the 24V AC signal coming from the two-wire connection. By reversing the direction of the current the power is able to be generated over the positive cycle and the negative cycle of the waveform.

Figure 3:
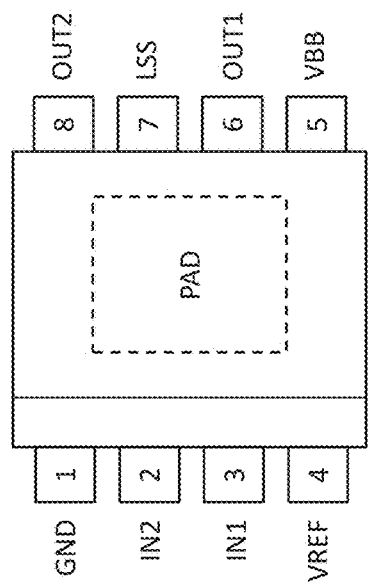
FIG. 3 shows an integrated circuit used for regenerating an AC signal in accordance with one or more embodiments.

FIG. 3 depicts an example circuit component 300 that may be used by the system 100. In one or more embodiments, the circuit component 300 can include an integrated circuit that incorporates logic to function as the bridge-type amplifier 106 of FIGS. 1 and 2, and that is configured to receive one or more digital inputs. As shown, pin 1 is connected to ground (GND) and pins 2, 3 receive an input signal. Pin 4 receives a reference voltage (VREF). Pin 5 is connected to a voltage rail (VBB) and receives a positive voltage, and pins 6, 8 provide outputs to a load. Pin 7 can be coupled to a voltage sensor (LSS).

In one or more embodiments, if a digital input 1 and a digital input 2 are provided to the inputs (IN1, IN2) of the circuit 300 the outputs (OUT1, OUT2) can be controlled to regenerate the output signal provided to the load. In a non-limiting example, to operate the bridge-type amplifier in the reverse mode the inputs IN1, IN2 can be configured to receive the digital input 0, 1, respectively, wherein the outputs OUT1, OUT2 are Low and High, respectively. To operate the bridge-type amplifier in a forward mode the inputs IN1, IN2 can be configured to receive a 1, 0 input, respectively. It should be understood the circuit 300 can be configured to operate in various modes such as a standby mode responsive to receive corresponding inputs.

Figure 4:
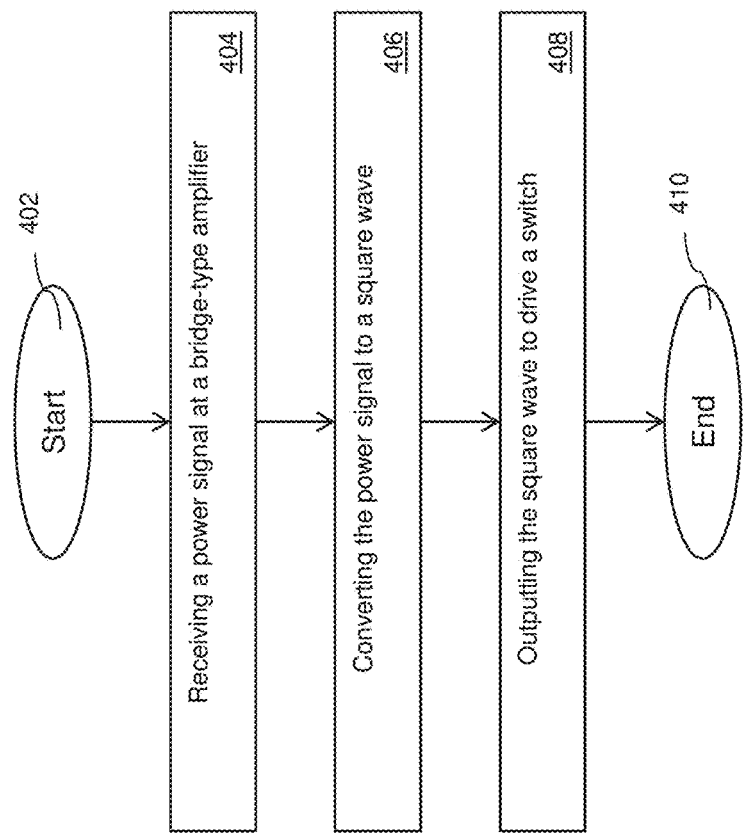
FIG. 4 shows a flowchart of a method for providing component control over a two-wire connection in accordance with one or more embodiments.

FIG. 4 depicts a flowchart of a method 400 for providing component control over a two-wire connection in accordance with one or more embodiments of the invention. It should be understood the method 400 can be implemented in the system 100 or any other type of system that implements two-wire connection architecture. The method 400 begins at block 402 and continues to block 404 which provides for receiving a power signal at a bridge-type amplifier. In one or more embodiments, the two-wire connection architecture provides power over the positive cycle of the waveform and provides communication of the negative cycle of the waveform. The two-wire connection architecture (which may be viewed as a 2-wire buss) is adapted to transmit both power and communication data without the need for additional wires. Block 406 illustrates the conversion of the power signal to a square wave by the bridge-type amplifier 106. Block 408 outputs the square wave to drive a switch. The method 400 ends at block 410. It should be understood steps shown in FIG. 4 are provided for illustrative purposes and are not intended to limit the scope. It will be appreciated that additional steps or a different sequence of steps may be incorporated to regenerate power signal to drive a high-power load.

The technical effects and benefits include enabling the operation of higher voltage A/C devices while simultaneously using the two-wire connection. The technical effects and benefits increase the versatility of the applications that use the 2-wire power line communication for control and communication with remote units.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An HVAC system for providing component control over a two-wire connection, the system comprising:
   a control unit connected to a power source;
   an outdoor unit coupled to the control unit over the two-wire connection, the two-wire connection consisting of a power/communication wire and a common wire, the two-wire connection carrying an AC signal;
   a bridge-type amplifier configured to receive a power signal from the remote unit, the bridge-type amplifier configured to generate a square wave from the power signal;
   a compressor contactor located in the outdoor unit;
   the bridge-type amplifier configured to provide the square wave to the compressor contactor to provide energy to the compressor contactor during a positive half cycle of the AC signal and a negative half cycle of the AC signal while maintaining the ability to communicate over the negative half cycle.

2. The HVAC system of claim 1, wherein the two-wire connection is a 2-wire buss configured to transmit power and communication data.

3. The HVAC system of claim 1, wherein the two-wire connection provides power on the positive cycle of the power signal and communication data on the negative cycle of the power signal between the control unit and the remote unit.

4. The HVAC system of claim 1, wherein the power signal is a direct current (DC) signal and the square wave is an alternating current (AC) signal.

5. The HVAC system of claim 1, wherein the control unit is an indoor unit of the HVAC system.

\* \* \* \* \*